Feb. 10, 1942. A. POPPE 2,272,582
POND AND FISH BOWL
Filed March 2, 1937 2 Sheets-Sheet 1
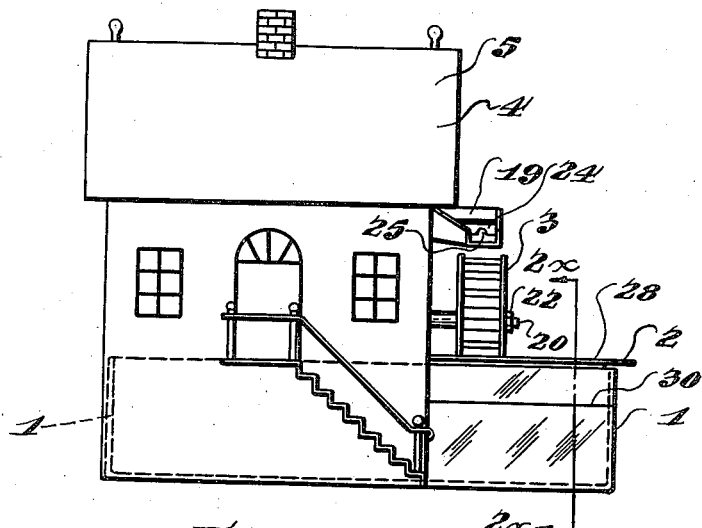
Fig. 1
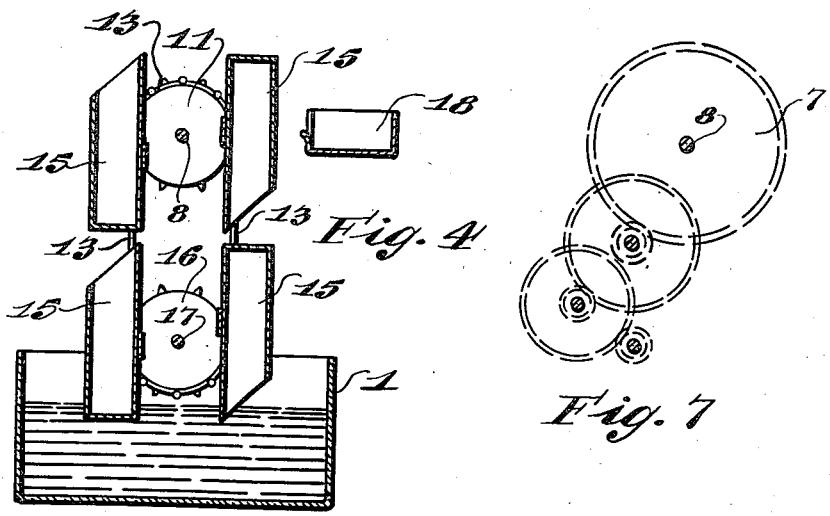
Fig. 4
Fig. 7
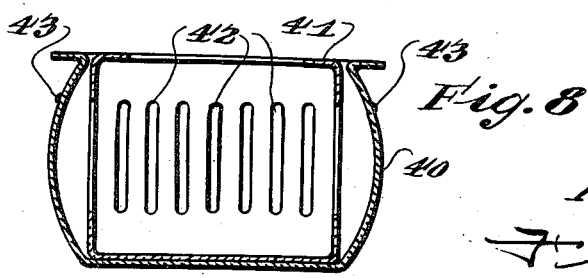
Fig. 8
INVENTOR
Alfred Poppe
BY
ATTORNEY Feb. 10, 1942. A. POPPE 2,272,582
POND AND FISH BOWL
Filed March 2, 1937 2 Sheets-Sheet 2

INVENTOR
Alfred Poppe
BY
ATTORNEY

Patented Feb. 10, 1942

2,272,582

UNITED STATES PATENT OFFICE 2,272,582

POND AND FISH BOWL

Alfred Poppe, Rochester, N. Y.

Application March 2, 1937, Serial No. 128,639

1 Claim. (Cl. 46—41)

The object of this invention is to provide a toy house in combination with a water wheel, fish-pond, and fish-bowl.

Another object of the invention is to provide a fish-bowl immersed in a part of the fish-pond, so that the water can flow into the fish-bowl and out from it into the pond.

Another object of the invention is to provide a fish-bowl that can be lifted out of the fish-pond, carrying the fish with it, the bowl being made so that it will hold water enough for the fish to live in temporarily.

These and other objects of the invention will be illustrated in the drawings, described in the specification, and pointed out in the claim at the end thereof.

In the drawings:

Figure 1 is a front elevation of the house with the fish-pond extending out on one side thereof.

Figure 4 is a section through the fish-pond, elevator, and trough, the section being taken on the line $4x$—$4x$ of Figure 3.

Figure 7 is a diagrammatic view of the reducing gear shown in Figure 3.

Figure 8 is a sectional view through a modified form of the pond and fish-bowl.

In the drawings like reference numerals indicate like parts.

Figures 2, 5, 6:
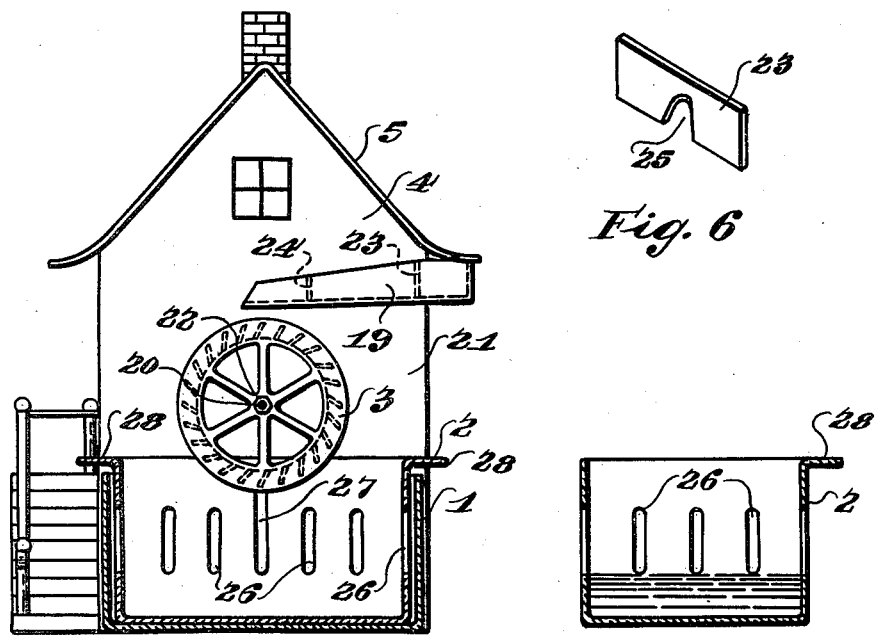
Figure 2 is a sectional elevation of the house, and fish-pond, and fish-bowl, the section being taken on the line $2x$—$2x$ of Figure 1.
Figure 5 is a section through the fish-bowl, the section being taken on the line $5x$—$5x$ of Figure 3, the bowl being shown removed from the fish-pond.
Figure 6 is a perspective view of a baffle plate used in the spout that feeds water to the water wheel.
Figure 3:
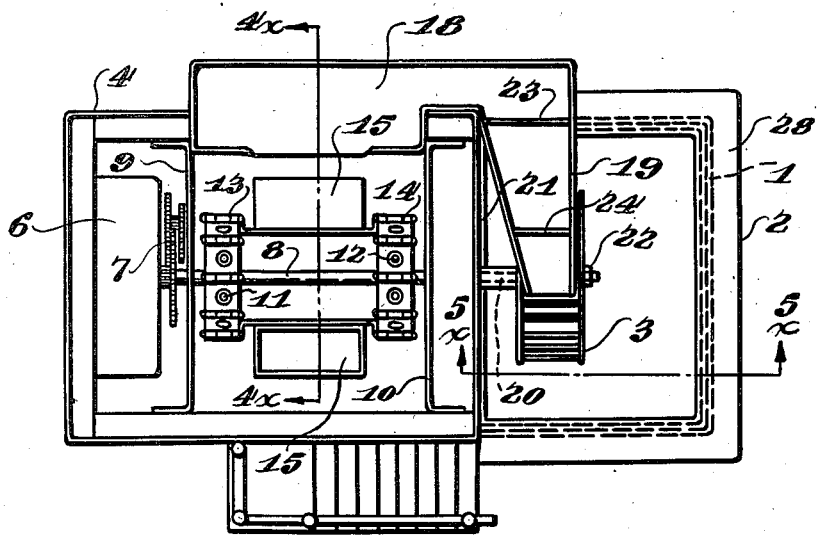
Figure 3 is a top plan view of the house with the roof removed.

In the drawings reference numeral 1 indicates the pond which extends through the whole basement of the house and projects outside of it on one end. 2 indicates the fish-bowl which is inside of the pond and is placed outside of the house and under the water wheel 3. Both the pond 1 and the fish-bowl 2 should preferably be made of glass and should be separate structurally from the house. The house 4 sits down over the pond 1, and covers one end of it, leaving the other end projecting out from under the house. The house is covered by a roof 5, which is preferably separate from the house and can be removed from the house. Inside of the house is provided an electric motor 6 which drives through reducing gears 7 the shaft 8, which is mounted to turn in the channel plates 9 and 10. On this shaft is carried a pair of sprocket wheels 11 and 12, over which pass the endless chains 13 and 14. These endless chains carry the elevator cups 15, 15, of which four are shown in Figure 4. The endless chain runs under the sprocket wheels 16 on the shaft 17, all of which are driven idly thereby.

The motor drives the shaft 8, and this in turn drives the endless chains 13 and 14 and causes the elevator cups 15 to dip into the water in the pond 1 as they go down on the right in Figure 4. The cups are filled with water and the cups raise the water on the left of Figure 4 and discharge it into the trough 18 shown on the right of Figure 4 near the top. The water runs along this trough into the spout 19, which discharges it onto the water wheel 3, and causes the water wheel to turn. The water wheel 3 is mounted on a stud 20 fastened in the wall 21 of the house. The water wheel is held on this stud by a nut 22. This nut can be removed so that the water wheel can be taken off. It is desirable to remove the water wheel in order to remove the fish bowl.

In the spout 19 is provided two baffle plates 23 and 24, each of which has its lower edge cut away to form an opening 25 therein such as is shown in Figure 6. The water is discharged by the elevator cups intermittently into the trough 18, and the baffles retard the flow so that a fairly uniform stream of water runs out of the spout 19 and strikes the water wheel 3, and before the trough 18 is emptied, it is filled again by another cup. In this way the water wheel is driven continuously at a fairly uniform angular velocity. The water is taken out of the pond inside of the house by the cups and discharged into the fish-bowl on the outside of the house, and from the fish-bowl it flows through the upright slots 26 back into the fish-pond, so that the same level is maintained in the bowl and pond.

In order to remove the bowl from the pond, the water wheel 3 is removed from its stud 20, as above described, and the fish bowl is raised up. To permit the bowl to be raised high enough, the bowl is provided with a special upright slot 27 which extends to the top and is open at the top. This slot straddles the stud 20 on which the water wheel revolves, so that the fish-bowl can be raised higher than the pond, and it can then be removed from the pond. The pond can then be emptied and cleaned and filled with fresh water, and the bowl can be put back in place, and the water wheel can again be mounted on its stud.

The slots 26 and 27 stop an inch or so short of the bottom of the fish-bowl, so that a considerable quantity of the water is retained in the bowl in which the fish can live and swim for a short time, at least, while the pond is being emptied and cleaned and filled with fresh water. The fish-bowl is provided with flanges 28 on three sides thereof, which serve as handles by which it can be raised. The flange on the side toward the house is omitted.

In Figure 8 I have shown a modified form of the pond and the fish-bowl, in which combination the house and the apparatus that goes therewith is omitted. In Figure 8 there is provided merely a stationary pond 40, inside of which is a fish-bowl 41 having the slots 42, 42 therein similar to the slots shown in Figure 5. It is apparent that the pond 40 holds considerably more water than does the bowl 41. The bowl 41 can be lifted out of the pond, retaining the fish in the bowl, and then the bowl 40 can be drained and cleaned and filled with fresh water. Thereafter the fish-bowl 41 can be put back in the pond 40.

In Figure 1 I have shown a water line 30 which indicates the height to which the pond should be filled so that it will not overflow when the fish-bowl is put in. In Figure 8 I have indicated a similar water line at 43 on the pond 40.

I claim:

A pond, a glass fish-bowl adapted to be positioned in said pond, said fish-bowl having flanges on three sides thereof, which flanges are adapted to engage with the edges of the pond, upright short slots in the fish-bowl through which water is adapted to flow from the fish-bowl into the pond, the bottoms of said slots being above the bottom of the bowl a sufficient distance to retain in the bowl water enough for the fish to swim in, a long slot in said bowl, a stud placed over the side of the fish-bowl in line with said long slot, said stud having a water wheel rotatably and removably mounted thereon, said stud being engaged in said slot on the raising of the bowl and permitting the raising of the bowl.

ALFRED POPPE.